(12) United States Patent
Ono et al.

(10) Patent No.: US 11,727,508 B2
(45) Date of Patent: Aug. 15, 2023

(54) TRANSPORTER VEHICLE MANAGEMENT SYSTEM AND TRANSPORTER VEHICLE MANAGEMENT METHOD

(71) Applicant: Komatsu Ltd., Tokyo (JP)

(72) Inventors: Ryota Ono, Tokyo (JP); Tomoko Jinno, Tokyo (JP)

(73) Assignee: Komatsu Ltd., Tokyo (JP)

( * ) Notice: Subject to any disclaimer, the term of this patent is extended or adjusted under 35 U.S.C. 154(b) by 365 days.

(21) Appl. No.: 16/328,034

(22) PCT Filed: Dec. 14, 2016

(86) PCT No.: PCT/JP2016/087294
§ 371 (c)(1),
(2) Date: Feb. 25, 2019

(87) PCT Pub. No.: WO2018/109885
PCT Pub. Date: Jun. 21, 2018

(65) Prior Publication Data
US 2019/0188807 A1 Jun. 20, 2019

(51) Int. Cl.
*G06Q 50/02* (2012.01)
*G06Q 10/20* (2023.01)
(Continued)

(52) U.S. Cl.
CPC ............ *G06Q 50/02* (2013.01); *G06Q 10/06* (2013.01); *G06Q 10/20* (2013.01); *G06Q 50/30* (2013.01)

(58) Field of Classification Search
None
See application file for complete search history.

(56) References Cited

U.S. PATENT DOCUMENTS

| 6,052,644 A | 4/2000 | Murakami et al. |
| 6,184,784 B1 * | 2/2001 | Shibuya ................ F02D 41/22 180/167 |

(Continued)

FOREIGN PATENT DOCUMENTS

| WO | 96/20336 A1 | 7/1996 |
| WO | 2016/013376 A1 | 1/2016 |

(Continued)

OTHER PUBLICATIONS

Caterpillar® Haul Road Design and Management—Numeralkodwww.numeralkod.com (Year: 2006).*

(Continued)

*Primary Examiner* — Maceeh Anwari
*Assistant Examiner* — Aarron E Santos
(74) *Attorney, Agent, or Firm* — Locke Lord LLP

(57) ABSTRACT

A transporter vehicle management system includes: a loading weight data acquisition unit that acquires loading weight data indicating a loading weight of a load on a transporter vehicle; a vehicle speed data acquisition unit that acquires vehicle speed data indicating a traveling speed of the transporter vehicle; a road surface data acquisition unit that acquires road surface data indicating a condition of a road surface on which the transporter vehicle travels; a current damage amount calculation unit that calculates a current damage amount of the transporter vehicle on the basis of the loading weight, the traveling speed, and the condition of the road surface; a target amount calculation unit that calculates a target loading weight or a target traveling speed in which the current damage amount is set to a predetermined value; and an output unit that outputs the target loading weight or the target traveling speed.

13 Claims, 5 Drawing Sheets

(51) Int. Cl.
*G06Q 50/30* (2012.01)
*G06Q 10/06* (2023.01)

(56) References Cited

U.S. PATENT DOCUMENTS

| | | | | |
|---|---|---|---|---|
| 8,145,513 | B2 | 3/2012 | Villalobos et al. | |
| 8,364,405 | B2 * | 1/2013 | Sprock | G06T 17/00 |
| | | | | 345/419 |
| 9,041,801 | B2 * | 5/2015 | Schweikart | E21C 41/00 |
| | | | | 348/143 |
| 9,262,559 | B2 * | 2/2016 | Mewes | G06Q 10/0639 |
| 9,752,289 | B2 * | 9/2017 | Jinno | B60W 40/06 |
| 9,891,627 | B2 * | 2/2018 | Kou | B60T 7/18 |
| 9,914,441 | B2 | 3/2018 | Takeda et al. | |
| 10,013,820 | B2 * | 7/2018 | Walker | G07C 5/008 |
| 11,105,050 | B2 * | 8/2021 | Masuda | E01C 23/00 |
| 11,270,231 | B2 * | 3/2022 | Rennie | G06Q 10/00 |
| 2007/0078579 | A1 | 4/2007 | Schricker | G06Q 10/08 |
| | | | | 701/50 |
| 2008/0004763 | A1 * | 1/2008 | Johnson | G01G 19/08 |
| | | | | 701/31.4 |
| 2008/0082347 | A1 * | 4/2008 | Villalobos | G07C 5/008 |
| | | | | 705/305 |
| 2008/0243381 | A1 * | 10/2008 | Villalobos | G06Q 10/0631 |
| | | | | 701/454 |
| 2009/0099886 | A1 * | 4/2009 | Greiner | G06Q 50/30 |
| | | | | 705/7.38 |
| 2016/0155277 | A1 * | 6/2016 | Asada | G07C 5/08 |
| | | | | 701/70 |
| 2016/0196699 | A1 * | 7/2016 | Chitty | G07C 5/006 |
| | | | | 701/31.7 |
| 2017/0151946 | A1 * | 6/2017 | Shiga | B60W 40/076 |
| 2018/0073208 | A1 * | 3/2018 | Wilson | G01C 7/04 |
| 2019/0188807 | A1 * | 6/2019 | Ono | G06Q 50/02 |

FOREIGN PATENT DOCUMENTS

| | | | | |
|---|---|---|---|---|
| WO | 2016/080555 A1 | 5/2016 | | |
| WO | WO-2016080555 A1 * | 5/2016 | | B60W 30/143 |

OTHER PUBLICATIONS

International Search Report dated Jan. 24, 2017, issued for PCT/JP2016/087294.

* cited by examiner

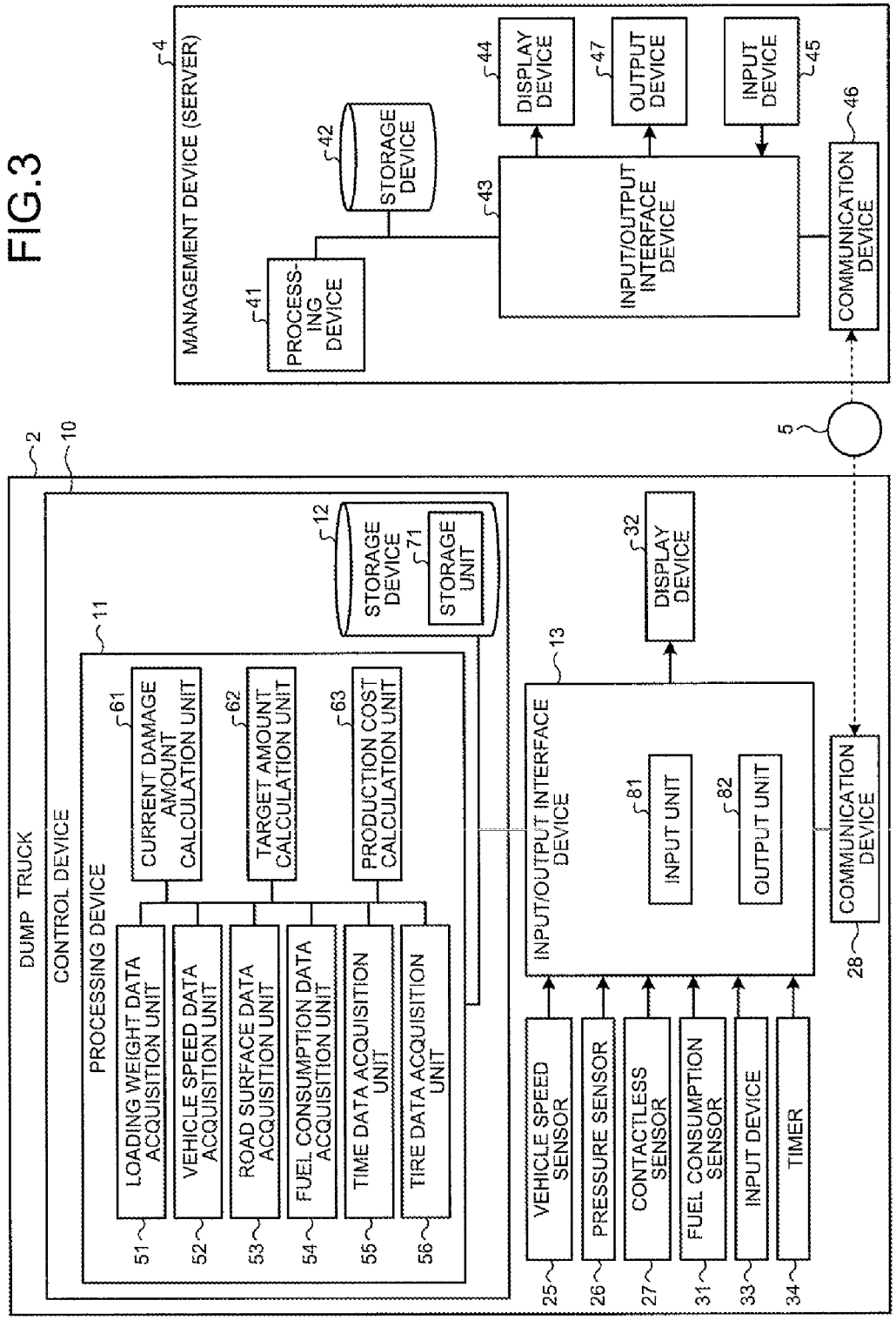

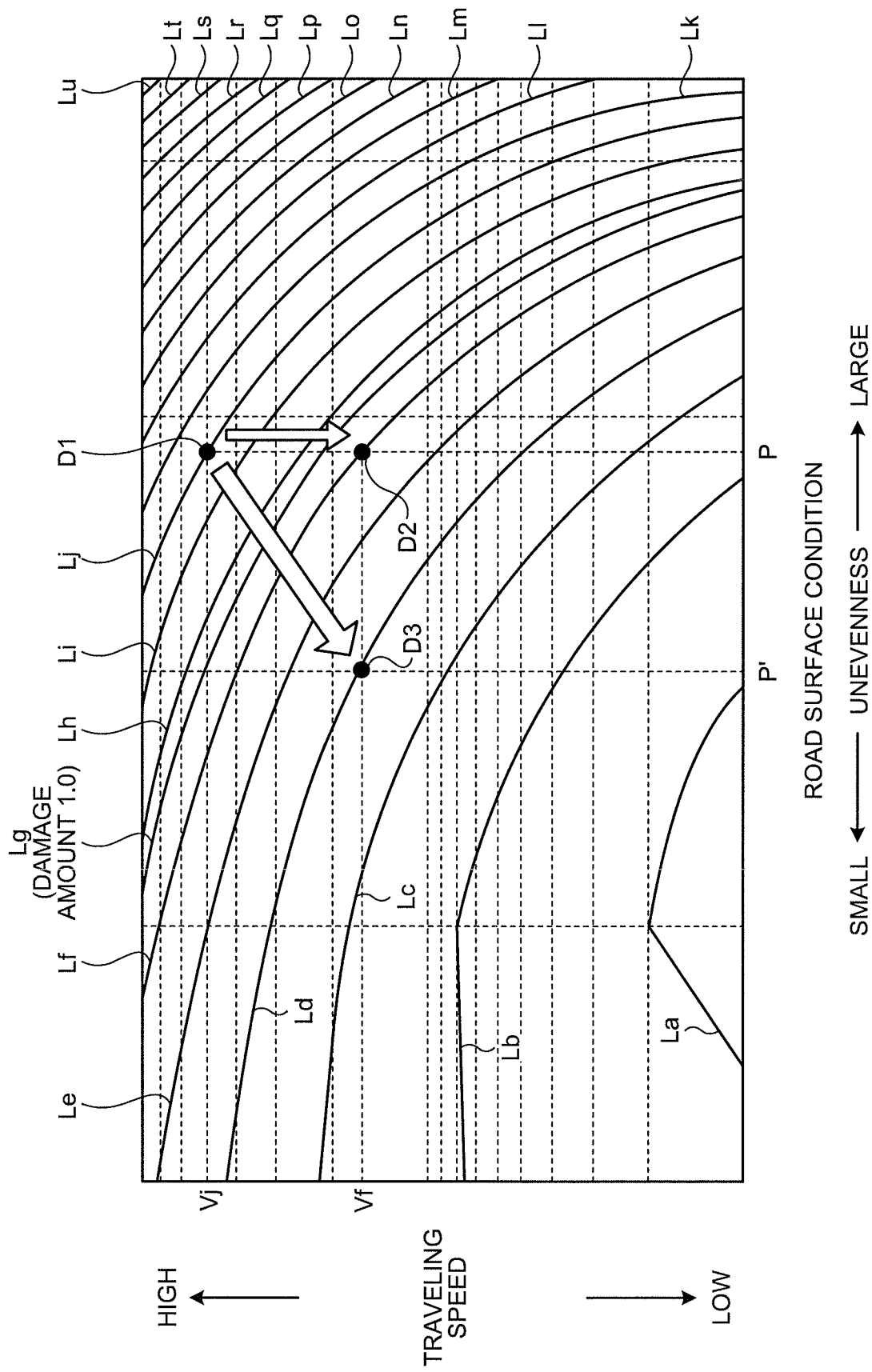

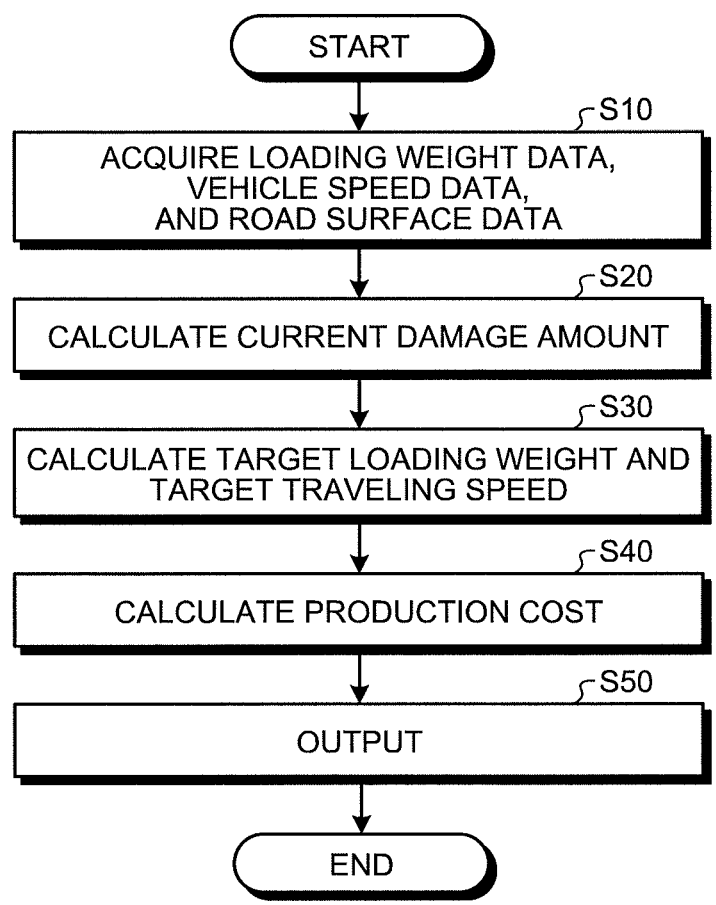

ered use conditions for the transporter vehicle are set. The recommended use conditions for the transporter vehicle, for example, include at least either the maximum loading weight or the highest traveling speed that makes damage to the transporter vehicle equal to or less than an allowable level. The recommended use conditions for the transporter vehicle are often uniformly set on the basis of the most severe operating environment expected in the mine. The operating environment of the transporter vehicle, for example, includes the road surface condition of the carrying path in the mine.

TRANSPORTER VEHICLE MANAGEMENT SYSTEM AND TRANSPORTER VEHICLE MANAGEMENT METHOD

FIELD

The present invention relates to a transporter vehicle management system and a transporter vehicle management method.

BACKGROUND

A transporter vehicle such as a dump truck, for example, travels on a carrying path set in a mine.

Recommended use conditions for the transporter vehicle are set. The recommended use conditions for the transporter vehicle, for example, include at least either the maximum loading weight or the highest traveling speed that makes damage to the transporter vehicle equal to or less than an allowable level. The recommended use conditions for the transporter vehicle are often uniformly set on the basis of the most severe operating environment expected in the mine. The operating environment of the transporter vehicle, for example, includes the road surface condition of the carrying path in the mine.

CITATION LIST

Patent Literature

Patent Literature 1: U.S. Pat. No. 8,145,513

SUMMARY

Technical Problem

The operating environment of the transporter vehicle varies from one mine to another. Further, the transporter vehicle does not necessarily operate under the most severe operating environment all the times. Thus, when the transporter vehicle operates under the recommended use conditions which are uniformly set, improvement in the productivity in the mine may be obstructed. For example, in a case where the road surface of the carrying path is in a good condition, even when the transporter vehicle carries a load more than the maximum loading weight or travels at a speed higher than the highest traveling speed, damage to the transporter vehicle may be less than the allowable level. When the transporter vehicle carries a load equal to or less than the maximum loading weight which is uniformly set or travels at a speed equal to or lower than the highest traveling speed which is uniformly set even through damage to the transporter vehicle may become the allowable level or less, improvement in the productivity in the mine is obstructed.

It is an object of an aspect of the present invention to provide a transporter vehicle management system and a transporter vehicle management method that are capable of improving the productivity in a mine while reducing damage to a transporter vehicle.

Solution to Problem

According to a first aspect of the present invention, a transporter vehicle management system comprises: a loading weight data acquisition unit that acquires loading weight data indicating a loading weight of a load on a transporter vehicle; a vehicle speed data acquisition unit that acquires vehicle speed data indicating a traveling speed of the transporter vehicle; a road surface data acquisition unit that acquires road surface data indicating a condition of a road surface on which the transporter vehicle travels; a current damage amount calculation unit that calculates a current damage amount of the transporter vehicle on the basis of the loading weight, the traveling speed, and the condition of the road surface; a target amount calculation unit that calculates a target loading weight or a target traveling speed in which the current damage amount is set to a threshold; and an output unit that outputs the target loading weight or the target traveling speed.

According to a second aspect of the present invention, a transporter vehicle management method comprises: acquiring loading weight data indicating a loading weight of a load on a transporter vehicle; acquiring vehicle speed data indicating a traveling speed of the transporter vehicle; acquiring road surface data indicating a condition of a road surface on which the transporter vehicle travels; calculating a current damage amount of the transporter vehicle on the basis of the loading weight, the traveling speed, and the condition of the road surface; and calculating a target loading weight or a target traveling speed in which the current damage amount is set to a threshold.

Advantageous Effects of Invention

The aspect of the present invention provides the transporter vehicle management system and the transporter vehicle management method that are capable of improving the productivity in a mine while reducing damage to the transporter vehicle.

BRIEF DESCRIPTION OF DRAWINGS

FIG. 3 is a functional block diagram illustrating an example of a control device and a management device which constitute a management system according to the present embodiment.

FIG. 4 is a diagram illustrating an example of correlation data stored in a storage unit according to the present embodiment.

FIG. 5 is a flowchart illustrating an example of a management method for the transporter vehicle according to the present embodiment.

DESCRIPTION OF EMBODIMENTS

Hereinbelow, an embodiment according to the present invention will be described with reference to the drawings. However, the present invention is not limited thereto. Elements of the embodiment described below may be appropriately combined. Further, some of the elements may not be used in some cases.

[Summary of Management System]

Figure 1:
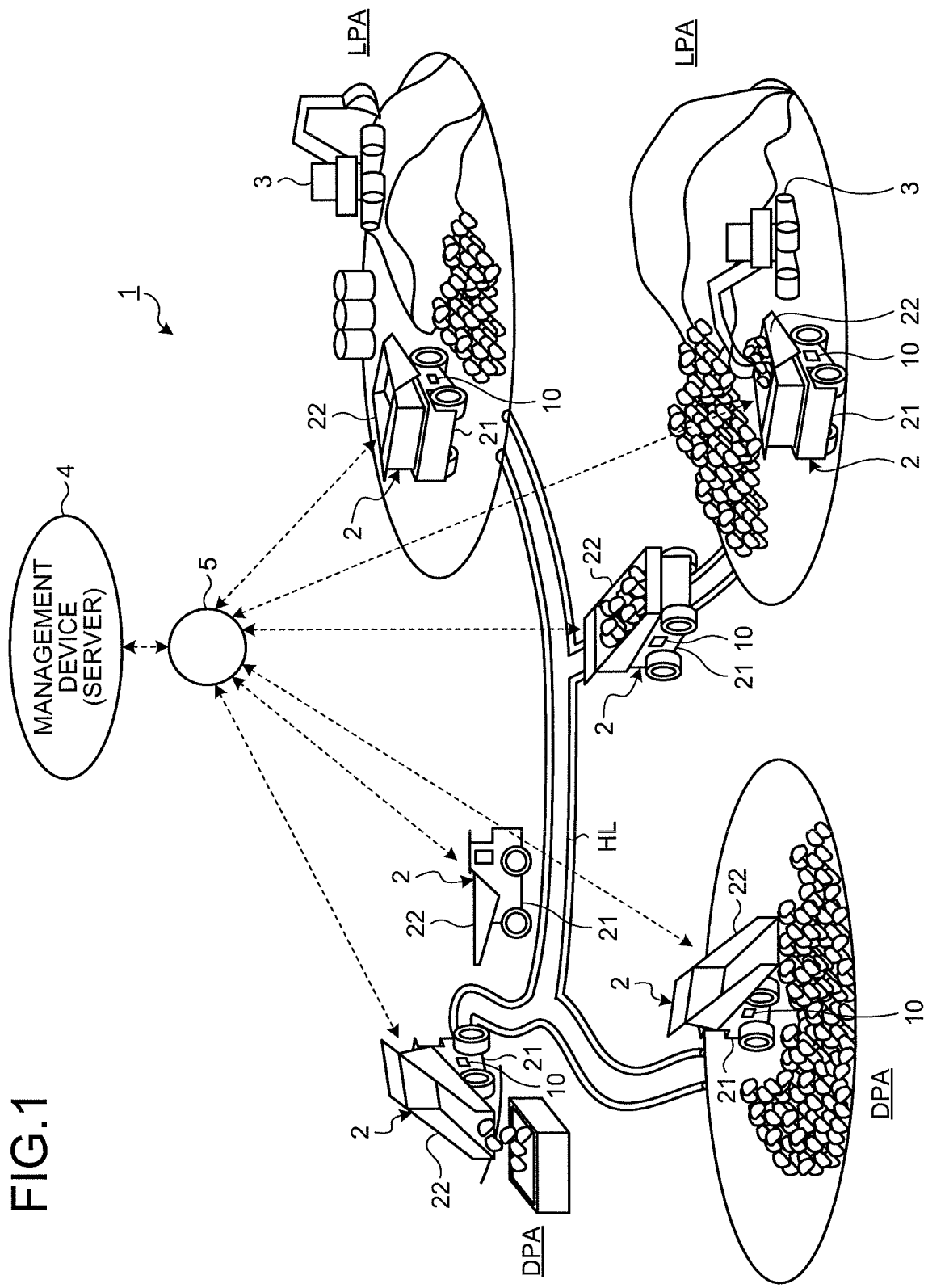
FIG. 1 is a diagram schematically illustrating an example of a management system of a transporter vehicle according to the present embodiment.

FIG. 1 is a diagram schematically illustrating an example of a management system 1 for a transporter vehicle 2 according to the present embodiment. The transporter vehicle 2 operates in a mine. The transporter vehicle 2 is a dump truck 2 which includes a body frame 21 and a vessel 22 which is supported by the body frame 21. In the present embodiment, the dump truck 2 includes a cab. The dump truck 2 is operated by a driver in the cab. That is, the dump truck 2 according to the present embodiment is a manned dump truck. The dump truck 2 includes a control device 10 which includes a computer system. The dump truck 2 may be capable of traveling or stopping by remote control or capable of performing automatic driving by autonomous travel. That is, the dump truck 2 may be an unmanned dump truck.

As illustrated in FIG. 1, the dump truck 2 travels on a loading site LPA in the mine, a soil discharging site DPA in the mine, and a carrying path HL. The loading site LPA is a place where a loading operation for loading a load onto the dump truck 2 is performed. The soil discharging site DPA is a place where a soil discharging operation for discharging a load from the dump truck 2 is performed. The carrying path HL is a path on which the dump truck 2 travels from one of the loading site LPA and the soil discharging site DPA to the other. A load is loaded onto the vessel 22 of the dump truck 2 by a loading machine 3 in the loading site LPA. For example, a wheel loader or an excavator is used as the loading machine 3. The dump truck 2 loaded with the load travels on the carrying path HL to the soil discharging site DPA. The dump truck 2 discharges the load from the vessel 22 in the soil discharging site DPA. After discharging the load, the dump truck 2 travels on the carrying path HL to the loading site LPA.

In the present embodiment, a series of operations of the dump truck 2 including the loading of a load in the loading site LPA, the traveling from the loading site LPA to the soil discharging site DPA, the discharge of the load in the soil discharging site DPA, and the traveling from the soil discharging site DPA to the loading site LPA is appropriately referred to as a cycle, and the time required for one cycle is appropriately referred to as a cycle time.

The management system 1 performs operation management for the dump truck 2 and evaluation of the productivity of the dump truck 2. The management system 1 includes a management device 4 which includes a computer system. The management device 4 functions as a server. The management device 4 performs data communication with the control device 10 of the dump truck 2 through a communication system 5. The management device 4 wirelessly communicates with each of a plurality of dump trucks 2 through the communication system 5. The communication system 5 includes at least one of a local area network (LAN), the internet, a mobile phone communication network, and a satellite communication network.

[Dump Truck]

Figure 2:
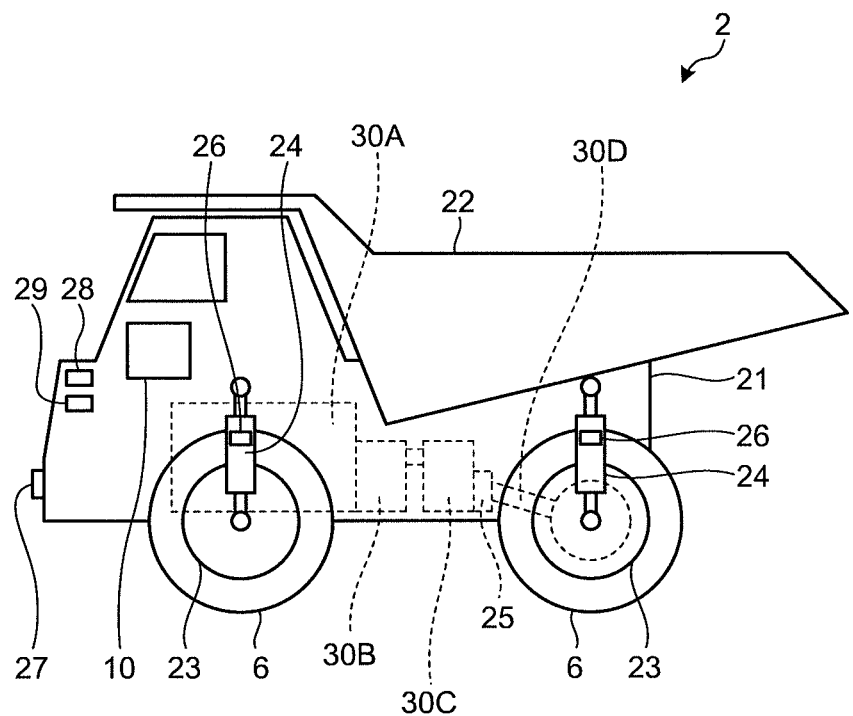
FIG. 2 is a diagram schematically illustrating an example of the transporter vehicle according to the present embodiment.

Next, an example of the dump truck 2 according to the present embodiment will be described. FIG. 2 is a diagram schematically illustrating an example of the dump truck 2 according to the present embodiment. The dump truck 2 is provided with the body frame 21, the vessel 22 which is supported by the body frame 21, a wheel 23 to which a tire 6 is attached, a suspension cylinder 24, a vehicle speed sensor 25, a pressure sensor 26, a contactless sensor 27, a communication device 28, a position detection device 29, and the control device 10.

In the present embodiment, the dump truck 2 is a rigid dump truck. The dump truck 2 may be an articulated dump truck which includes a front body frame, a rear body frame, and an articular mechanism which couples the front body frame to the rear body frame.

The dump truck 2 includes an internal combustion engine 30A such as a diesel engine. The internal combustion engine 30A drives a drive shaft 30D through a torque converter 30B and a transmission 30C. The wheel 23 rotates by driving the drive shaft 30D. The dump truck 2 may include a generator which is operated by power generated by the internal combustion engine 30A and an electric motor which rotates the wheel 23 by electric power generated by the generator.

The vessel 22 is a bed on which a load is loaded. The vessel 22 is tiltably disposed on the upper part of the body frame 21. The loading machine 3 loads a load onto the vessel 22.

The suspension cylinder 24 is disposed between the wheel 23 and the body frame 21. Hydraulic oil is sealed inside the suspension cylinder 24. The suspension cylinder 24 extends and contracts according to the weight of the load. A load according to the mass of the body frame 21 and the vessel 22 acts on the wheel 23 through the suspension cylinder 24.

The vehicle speed sensor 25 detects a rotation speed of the drive shaft 30D which drives the wheel 23 to detect a traveling speed of the dump truck 2.

The pressure sensor 26 detects a load acting on the suspension cylinder 24. The pressure sensor 26 is disposed on the suspension cylinder 24 of the dump truck 2. The pressure sensor 26 detects the pressure of the hydraulic oil in the suspension cylinder 24 to detect a loading weight indicating the weight of the load loaded on the vessel 22. The pressure sensor 26 functions as a loading weight sensor.

The contactless sensor 27 contactlessly detects an object in front of the dump truck 2. In the present embodiment, the contactless sensor 27 functions as a road surface condition sensor which detects a road surface condition of the carrying path HL on which the dump truck 2 travels. The contactless sensor 27 contactlessly detects the road surface condition of the carrying path HL. The road surface condition includes an unevenness condition of the road surface. The unevenness condition of the road surface includes at least either the size of unevenness or the frequency of unevenness.

The contactless sensor 27 is disposed at the front of the body frame 21. For example, a radar device can be used as the contactless sensor 27. The contactless sensor 27 may be any sensor capable of contactlessly detecting the road surface condition. For example, the contactless sensor 27 may include a laser scanner device, an ultrasonic sensor, or a stereo camera device.

The pressure sensor 26 may function as the road surface condition sensor which detects the road surface condition of the carrying path HL. The pressure of the hydraulic oil in the suspension cylinder 24 fluctuates according to the unevenness condition of the road surface. The unevenness condition of the road surface may be estimated on the basis of detection data of the pressure sensor 26.

The communication device 28 is capable of communicating with the management device 4 through the communication system 5. The communication device 28 is connected to the control device 10.

The position detection device 29 detects an absolute position indicating the position of the dump truck 2 in a global coordinate system by a global navigation satellite system (GLASS).

[Control Device and Management Device]

Next, an example of the control device 10 and the management device 4 according to the present embodiment will be described. FIG. 3 is a functional block diagram illustrating an example of the control device 10 and the management device 4 which constitute the management system 1 according to the present embodiment.

The control device 10 includes the computer system. The control device 10 includes a processing device 11 and a storage device 12. The control device 10 is connected to an input/output interface device 13.

The processing device 11 includes a microprocessor such as a central processing unit (CPU). The storage device 12 includes a memory and a storage such as a read only memory (ROM) or a random access memory (RAM). The processing device 11 performs arithmetic processing in accordance with a computer program stored in the storage device 12.

The input/output interface device 13 is connected to the vehicle speed sensor 25, the pressure sensor 26, the contactless sensor 27, a fuel consumption sensor 31, a display device 32, an input device 33, a timer 34, and the communication device 28. The input/output interface device 13 performs data communication with the control device 10 and the communication device 28. The input/output interface device 13 performs data communication with various sensors including the vehicle speed sensor 25, the pressure sensor 26, the contactless sensor 27, and the fuel consumption sensor 31, the display device 32, the input device 33, and the timer 34.

The display device 32 includes a flat panel display such as a liquid crystal display (LCD) or an organic electroluminescence display (OELD). The input device 33 is operated to generate input data. In the present embodiment, the input device 33 includes a touch sensor which is disposed on a display screen of the display device 32. The display device 32 includes a touch panel.

The management device 4 includes the computer system. The management device 4 includes a processing device 41, a storage device 42, an input/output interface device 43, a display device 44, an input device 45, a communication device 46, and an output device 47.

The processing device 41 includes a microprocessor such as a CPU. The storage device 42 includes a memory and a storage such as a ROM or RAM.

The input/output interface device 43 performs data communication with the processing device 41, the storage device 42, the display device 44, the input device 45, the communication device 46, and the output device 47.

The display device 44 includes a flat panel display. The input device 45 is operated to generate input data. The input device 45 includes at least either a keyboard or a mouse. The input device 45 may include a touch sensor which is disposed on a display screen of the display device 44. The communication device 46 wirelessly performs data communication with the control device 10. The output device 47 includes a printer, a mobile terminal, or a personal computer.

The processing device 11 includes a loading weight data acquisition unit 51, a vehicle speed data acquisition unit 52, a road surface data acquisition unit 53, a fuel consumption data acquisition unit 54, a time data acquisition unit 55, a tire data acquisition unit 56, a current damage amount calculation unit 61, a target amount calculation unit 62, and a production cost calculation unit 63.

The storage device 12 includes a storage unit 71.

The input/output interface device 13 includes an input unit 81 and an output unit 82.

The loading weight data acquisition unit 51 calculates the loading weight indicating the weight of a load loaded on the vessel 22 of the dump truck 2 on the basis of detection data of the pressure sensor 26. The loading weight data acquisition unit 51 acquires loading weight data indicating the loading weight of the load on the dump truck 2 by calculating the loading weight.

The vehicle speed data acquisition unit 52 calculates the traveling speed of the dump truck 2 on the basis of detection data of the vehicle speed sensor 25. The vehicle speed data acquisition unit 52 acquires traveling speed data indicating the traveling speed of the dump truck 2 by calculating the traveling speed.

The road surface data acquisition unit 53 calculates the condition of the road surface on which the dump truck 2 travels on the basis of detection data of the road surface condition sensor (e.g., the contactless sensor 27). As described above, the road surface condition includes the unevenness condition of the road surface. The unevenness condition of the road surface includes at least either the size of unevenness or the frequency of unevenness. The size of unevenness includes the difference in height between adjacent projection and depression. The frequency of unevenness includes the number of projections and depressions per unit distance.

The road surface data acquisition unit 53 acquires road surface data indicating the condition of the road surface on which the dump truck 2 travels by calculating the road surface condition. The road surface data acquisition unit 53 may acquire the road surface data on the basis of detection data of the pressure sensor 26. The pressure of the hydraulic oil in the suspension cylinder 24 fluctuates according to the unevenness condition of the road surface. Thus, the road surface data acquisition unit 53 may estimate the road surface condition on the basis of detection data of the pressure sensor 26.

The fuel consumption data acquisition unit 54 calculates a fuel consumption of the dump truck 2 on the basis of detection data of the fuel consumption sensor 31. For example, a fuel consumption sensor including a sensor which detects the amount of fuel injected by a fuel injection device which injects fuel into a combustion chamber of the internal combustion engine 30A can be used as the fuel consumption sensor 31. Alternatively, the fuel consumption sensor 31 may include a fuel gauge which detects the amount of fuel stored in a fuel tank of the dump truck 2 and an odometer which detects the travel distance of the dump truck 2. The fuel consumption data acquisition unit 54 calculates the fuel consumption required for the dump truck 2 to travel a certain distance. The fuel consumption data acquisition unit 54 acquires fuel consumption data indicating the fuel consumption required for the dump truck 2 to travel the certain distance by calculating the fuel consumption. The fuel consumption data may be a travel distance of the dump truck 2 per unit volume of the fuel.

The time data acquisition unit 55 calculates the time required for the dump truck 2 to travel through a predetermined course in the mine on the basis of detection data of the timer 34. The carrying path HL of the predetermined course is the carrying path HL where the dump truck 2 travels the series of operations corresponding to the above cycle. In the present embodiment, the time data acquisition unit 55 calculates the cycle time indicating the time required for the dump truck 2 for one cycle. For example, the timer 34 detects a first time point when a load is loaded onto the vessel 22 in the loading site LPA on the basis of detection data of the pressure sensor 26. The dump truck 2 travels from the loading site LPA to the soil discharging site DPA and performs a soil discharging operation in the soil discharging site DPA. Then, the dump truck 2 travels from the soil discharging site DPA to the loading site LPA and performs a loading operation again in the loading site LPA. The timer 34 detects a second time point when a load is loaded onto the vessel 22 again in the loading site LPA on the basis of detection data of the pressure sensor 26. The time data acquisition unit 55 calculates the cycle time required for the dump truck 2 for one cycle on the basis of the first time point and the second time point. The time data acquisition unit 55 acquires time data indicating the cycle time which is the time required for the dump truck 2 to travel through the predetermined course in the mine by calculating the cycle time.

The tire data acquisition unit 56 acquires tire data indicating the life of the tire 6 of the dump truck 2. In the present embodiment, the tire data acquisition unit 56 calculates the life of the tire 6 on the basis of ton km per hour (TKPH) indicating a load index of the tire 6. The TKPH is an index indicating the influence of a load acting on the tire 6 and the traveling speed of the tire 6 on the tire 6 and represented by "[TKPH]=[average tire load]×[average operation speed]". The average tire load is represented by "[average tire load]= ([tire load when unloaded]+[tire load when loaded])/2". The average operation speed is represented by "[average operation speed]=[travel distance for one cycle]×[the number of cycles per day]/[operation time per day]". The tire data acquisition unit 56 acquires tire data indicating the life of the tire 6 of the dump truck 2 by calculating the life of the tire 6 on the basis of the TKPH.

The current damage amount calculation unit 61 calculates a current damage amount of the dump truck 2 on the basis of the loading weight acquired by the loading weight data acquisition unit 51, the traveling speed acquired by the vehicle speed data acquisition unit 52, and the road surface condition acquired by the road surface data acquisition unit 53. In the present embodiment, the current damage amount calculation unit 61, for example, calculates the current damage amount of the body frame 21 of the dump truck 2.

The damage amount is an index indicating a fatigue cumulative frequency acting on the body frame 21 and a function of a stress acting on the body frame 21 per unit time. As the loading weight increases, the damage amount increases. As the loading weight decreases, the damage amount decreases. As the traveling speed increases, the damage increases. As the traveling speed decreases, the damage decreases. As the size of unevenness of the road surface increases or the frequency of unevenness of the road surface increases, the damage amount increases. As the size of unevenness of the road surface decreases or the frequency of unevenness of the road surface decreases, the damage amount decreases.

In the present embodiment, the damage amount is a numerical value indicating how many times an equivalent stress acting on the body frame 21 in any cycle is relative to a reference value 1.0 when an equivalent stress acting on the body frame 21 in a reference cycle is defined as the reference value 1.0. The reference cycle is, for example, determined in the following manner. Data of the distance, the gradient, the traveling speed, and the roughness of the road surface in the carrying path from the loading site to the soil discharging site is acquired for a plurality of mines, and the mean of the data is obtained. Then, the dump truck 2 is caused to travel on a carrying path simulating the obtained mean, that is, in the reference cycle, and the equivalent stress acting on the body frame 21 is obtained.

The target amount calculation unit 62 calculates a target loading weight of the dump truck 2 and a target traveling speed of the dump truck 2 that make the current damage amount calculated by the current damage amount calculation unit 61 equal to or less than a threshold. In the present embodiment, the threshold is the reference value 1.0. Excessive damage to the body frame 21 is prevented by making the current damage amount equal to or less than the threshold.

In the present embodiment, the storage unit 71 stores therein the loading weight of the dump truck 2, the traveling speed of the dump truck 2, the condition of the road surface on which the dump truck 2 travels, the damage amount of the body frame 21 of the dump truck 2, and correlation data indicating the relationship therebetween. The target amount calculation unit 62 calculates the target loading weight of the dump truck 2 and the target traveling speed of the dump truck 2 on the basis of the correlation data stored in the storage unit 71.

FIG. 4 is a diagram illustrating an example of the correlation data stored in the storage unit 71 according to the present embodiment. FIG. 4 illustrates the relationship between the traveling speed, the road surface condition, and the damage amount in the dump truck 2 with a loading weight A1 [ton]. In FIG. 4, the horizontal axis represents the road surface condition, and the vertical axis represents the traveling speed. As a value in the horizontal axis increases, unevenness of the road surface increases. As a value in the vertical axis increases, the traveling speed increases. A plurality of lines (La to Lu) in FIG. 4 indicates the damage amount. A line Lg indicates the damage amount 1.0. A range between a line La and a line Lf below the line Lg indicates a damage amount equal to or less than the threshold. A range between a line Lh and a line Lu indicates a damage amount larger than the threshold.

The correlation data illustrated in FIG. 4 is, for example, obtained from an experiment. The correlation data is, for example, generated on the basis of a detection value of a stress gauge when the dump truck 2 travels on road surfaces having various road surface conditions at various traveling speeds with the stress gauge attached to the body frame 21 of the dump truck 2.

FIG. 4 illustrates the correlation data for the loading weight A1. The correlation data as illustrated in FIG. 4 is prepared for each of a plurality of loading weights (A2, A3, A4, A5 and so on) and stored in the storage unit 71.

The target amount calculation unit 62 calculates the target loading weight and the target traveling speed that make the current damage amount equal to or less than the threshold on the basis of the current damage amount calculated by the current damage amount calculation unit 61 and the correlation data stored in the storage unit 71. For example, the current loading weight acquired by the loading weight data acquisition unit 51 is the loading weight A1, the current traveling speed acquired by the vehicle speed data acquisition unit 52 is a traveling speed Vj, and the current road surface condition acquired by the road surface data acquisition unit 53 is a condition P. The target amount calculation unit 62 selects correlation data corresponding to the loading weight A1. In this case, as illustrated in FIG. 4, the current damage amount is a damage amount indicated by a line Lj passing through a point D1. The damage amount indicated by the line Lj is larger than the threshold indicated by the line Lg. Thus, the target amount calculation unit 62 calculates the target traveling speed on the basis of the correlation data so that the current damage amount becomes equal to or less than the threshold. For example, the target amount calculation unit 62 sets the target traveling speed to a traveling speed Vf which is lower than the traveling speed Vj. Accordingly, a point D2 corresponding to the traveling speed Vf is located on the line Lf, and the damage amount becomes a damage amount indicated by the line Lf.

If the road surface condition can be improved by reducing unevenness of the road surface by performing maintenance of the carrying path HL on which the dump truck 2 travels, the road surface condition in the correlation data becomes a condition P' from the current condition P. Thus, when the target traveling speed is set to the traveling speed Vf which is lower than the traveling speed Vj, the damage amount becomes a damage amount indicated by a line Ld passing through a point D3.

An example in which the current damage amount is made equal to or less than the threshold by changing the target traveling speed from the traveling speed Vj to the traveling speed Vf without changing the loading weight A1 has been described above. The loading weight may be changed from the loading weight A1 to the loading weight A2 which is smaller than the loading weight A1 to make the current damage amount equal to or less than the threshold. Further, both the loading weight and the traveling speed may be changed to make the current damage amount equal to or less than the threshold.

The production cost calculation unit 63 calculates a production cost of the mine on the basis of the target loading weight calculated by the target amount calculation unit 62, the target traveling speed calculated by the target amount calculation unit 62, the fuel consumption of the dump truck 2 when the dump truck 2 travels with the target loading weight and at the target traveling speed, the cycle time required for the dump truck 2 to travel through a predetermined course in the mine for one cycle with the target loading weight and at the target traveling speed, and the life of the tire 6.

The fuel consumption can be acquired by the fuel consumption data acquisition unit 54 by calculating the fuel consumption of the dump truck 2 when the dump truck 2 travels with the target loading weight and at the target traveling speed. The cycle time can be acquired by the time data acquisition unit 55 by calculating the cycle time required for the dump truck 2 to travel through the predetermined course in the mine for one cycle with the target loading weight and at the target traveling speed. The distance of the predetermined course is known and stored in the storage unit 71. The life of the tire 6 can be acquired by the tire data acquisition unit 56 by substituting a tire load when loaded based on the target loading weight and known information (the travel distance for one cycle, the number of cycles per day, the operation time per day, and a tire load when unloaded) into the above calculation formula for the TKPH.

In the present embodiment, the production cost calculation unit 63 calculates the production cost on the basis of the following formula (1).

$$[\text{production cost (\$/ton)}]=[\text{fuel consumption+tire life}]/[\text{loading weight/cycle time}] \quad (1)$$

The fuel consumption fluctuates according to at least the target loading weight, the target traveling speed, or the distance of the predetermined course. As can be understood from the above calculation formula for the TKPH, the life of the tire also fluctuates according to at least the target loading weight, the target traveling speed, or the distance of the predetermined course. The cycle time fluctuates according to at least the target traveling speed or the distance of the predetermined course. The "life of the tire" may not be used in the calculation of the production cost.

In the present embodiment, the production cost calculation unit 63 performs numerical calculation to calculate an optimal target loading weight and an optimal target traveling speed so that the current damage amount becomes equal to or less than the threshold and the production cost represented by formula (1) becomes minimum.

The input unit 81 receives various data items from the vehicle speed sensor 25, the pressure sensor 26, the contactless sensor 27, the fuel consumption sensor 31, the input device 33, and the timer 34. Further, the input unit 81 receives various data items from the processing device 11 and the storage device 12.

The output unit 82 outputs the target loading weight or the target traveling speed calculated by the target amount calculation unit 62. In the present embodiment, the output unit 82 generates display data indicating the target loading weight or the target traveling speed and outputs the generated display data to the display device 32. The display device 32 displays the target loading weight or the target traveling speed calculated by the target amount calculation unit 62. Further, the output unit 82 may output the target loading weight or the target traveling speed calculated by the target amount calculation unit 62 to the management device 4 through the communication system 5. The management device 4 may store the target loading weight, the target traveling speed, and the production cost in the storage device 42 or may display the target loading weight, the target traveling speed, and the production cost on the display device 44. Further, the management device 4 may output the target loading weight, the target traveling speed, and the production cost to the output device 47.

The output unit 82 outputs the production cost calculated by the production cost calculation unit 63 to the display device 32. Further, the output unit 82 outputs the production cost calculated by the production cost calculation unit 63 to the management device 4. Further, the output unit 82 outputs the optimal target loading weight and the optimal target traveling speed that make the current damage amount equal to or less than the threshold and minimize the production cost represented by formula (1), the optimal target loading weight and the optimal target traveling speed being calculated by the production cost calculation unit 63, to the display device 32 and the management device 4.

[Management Method]

Next, a management method for the dump truck 2 according to the present embodiment will be described. FIG. 5 is a flowchart illustrating an example of the management method for the dump truck 2 according to the present embodiment.

The loading weight data acquisition unit 51 acquires loading weight data indicating the loading weight of a load on the dump truck 2 on the basis of detection data of the pressure sensor 26. The vehicle speed data acquisition unit 52 acquires vehicle speed data indicating the traveling speed of the dump truck 2 on the basis of detection data of the vehicle speed sensor 25. The road surface data acquisition unit 53 acquires road surface data indicating the condition of the road surface on which the dump truck 2 travels on the basis of, for example, detection data of the contactless sensor 27 (step S10).

The current damage amount calculation unit 61 calculates the current damage amount of the dump truck 2 on the basis of the loading weight data, the vehicle speed data, and the road surface data (step S20).

The target amount calculation unit 62 calculates the target loading weight and the target traveling speed that make the current damage amount equal to or less than the threshold on the basis of correlation data stored in the storage unit 71 (step S30). The target amount calculation unit 62 may calculate either the target loading weight or the target traveling speed. The target amount calculation unit 62 may calculate the target loading weight or the target traveling speed that minimizes the production cost represented by formula (1), the production cost being calculated by the production cost calculation unit 63, and then recalculate the target loading weight or the target traveling speed so that the current damage amount becomes equal to or less than the threshold.

The production cost calculation unit 63 performs numerical calculation to calculate the optimal target loading weight and the optimal target traveling speed so that the current damage amount becomes equal to or less than the threshold and the production cost represented by formula (1) becomes minimum (step S40). The current target loading weight or the current target traveling speed may be maintained, and only either the optimal target loading weight or the optimal target traveling speed may be calculated as long as the current damage amount becomes equal to or less than the threshold and the production cost represented by formula (1) becomes minimum. Further, the production cost calculation unit 63 may calculate a plurality of patterns of a combination of the production cost, the target loading weight, and the target traveling speed, and transmit the calculated patterns to the output unit 82.

The output unit 82 outputs the target loading weight and the target traveling speed both calculated by the target amount calculation unit 62. Further, the output unit 82 outputs the production cost calculated by the production cost calculation unit 63 (step S50).

[Action and Effect]

As described above, in the present embodiment, the current damage amount of the dump truck 2 is calculated on the basis of the loading weight of the dump truck 2, the traveling speed of the dump truck 2, and the condition of the road surface on which the dump truck 2 travels. Thus, the current damage amount corresponding to an operating environment of the dump truck 2 is calculated. Further, the target loading weight and the target traveling speed of the dump truck 2 are calculated on the basis of the current damage amount corresponding to the operating environment of the dump truck 2. That is, in the present embodiment, use conditions of the dump truck 2 are not uniformly set, but optimally set on the basis of, for example, the operating environment of the dump truck 2 which varies from one mine to another. Further, the calculated target loading weight and target traveling speed are output. Accordingly, it is possible to provide a user of the dump truck 2 with information indicating optimal use conditions including the optimal target loading weight and the optimal target traveling speed. Thus, for example, the loading weight is prevented from being reduced more than necessary, or the traveling speed is prevented from being reduced more than necessary. Thus, it is possible to improve the productivity in the mine while reducing the damage amount of the dump truck 2.

In the present embodiment, the production cost of the mine is calculated, and the target loading weight and the target traveling speed are calculated so that the production cost becomes minimum. Thus, it is possible to provide a user of the dump truck 2 with information indicating optimal use conditions that enable reduction of the production cost.

In the above embodiment, the target amount calculation unit 62 calculates the target loading weight or the target traveling speed that makes the current damage amount equal to or less than the threshold. The target amount calculation unit 62 may calculate a target road surface condition that makes the current damage amount equal to or less than the threshold on the basis of the correlation data stored in the storage unit 71. Maintenance of the road surface of the carrying path HL in the mine is performed so that the road surface condition of the carrying path HL in the mine becomes the target road surface condition calculated by the target amount calculation unit 62. Accordingly, an increase in the damage amount of the body frame 21 of the dump truck 2 which travels on the carrying path HL having the improved load surface condition is prevented.

In the above embodiment, the target amount calculation unit 62 calculates the target loading weight or the target traveling speed that makes the current damage amount equal to or less than the threshold (referent value 1.0). The target amount calculation unit 62 may calculate the target loading weight and the target traveling speed that make the current damage amount larger than the threshold. For example, even when the current damage amount falls within a predetermined range larger than the reference value, excessive damage acting on the body frame 21 is prevented when the occurrence frequency thereof is less than a predetermined amount. In this manner, the target amount calculation unit 62 may calculate the target loading weight and the target traveling speed that bring the current damage amount within the predetermined range larger than the reference value. That is, the target amount calculation unit 62 calculates the target loading weight and the target traveling speed that change the current damage amount to a predetermined value.

In the above embodiment, the current damage amount calculation unit 61 calculates the current damage amount on the basis of the loading weight, the traveling speed, and the road surface condition. For example, the current damage amount may be estimated on the basis of a result of measurement by an inertial measurement unit (IMU) which is disposed on the body frame 21 of the dump truck 2. The inertial measurement unit calculates acceleration in a rotation direction around each of three axes (an X axis, a Y axis, and a Z axis) which are perpendicular to each other (pitch acceleration indicating the acceleration in a $\theta X$ direction, rolling acceleration indicating the acceleration in a $\theta Y$ direction, and yaw acceleration indicating the acceleration in a $\theta Z$ direction). Accordingly, the stress acting on the body frame 21 is estimated. Thus, it is possible to estimate the current damage amount. A stress gauge may be disposed on the body frame 21, and the current damage amount may be derived on the basis of a result of detection by the stress gauge.

In the above embodiment, the management device 4 may include some or all of the functions of the control device 10 of the dump truck 2. For example, the processing device 41 of the management device 4 may be provided with at least one of the current damage amount calculation unit 61, the target amount calculation unit 62, and the production cost calculation unit 63. When detection data of the vehicle speed sensor 25, detection data of the pressure sensor 26, and detection data of the contactless sensor 27 are transmitted to the management device 4 through the communication system 5, the processing device 41 of the management device 4 is capable of calculating the target loading weight, the target traveling speed, and the target road surface condition for reducing or optimizing the current damage amount so as to be the predetermined value and calculating the production cost and the target loading weight or the target traveling speed for minimizing the production cost.

In the above embodiment, a maintenance plan for the dump truck 2 may be formulated or service parts of the dump truck 2 may be prepared on the basis of the calculated current damage amount. Further, a driving condition for reducing the current damage amount may be guided to the driver on the basis of the calculated current damage amount.

REFERENCE SIGNS LIST

1 MANAGEMENT SYSTEM
2 DUMP TRUCK (TRANSPORTER VEHICLE)

3 LOADING MACHINE
4 MANAGEMENT DEVICE
5 COMMUNICATION SYSTEM
6 TIRE
10 CONTROL DEVICE
11 PROCESSING DEVICE
12 STORAGE DEVICE
13 INPUT/OUTPUT INTERFACE DEVICE
21 BODY FRAME
22 VESSEL
23 WHEEL
24 SUSPENSION CYLINDER
25 VEHICLE SPEED SENSOR
26 PRESSURE SENSOR
27 CONTACTLESS SENSOR
28 COMMUNICATION DEVICE
29 POSITION DETECTION DEVICE
30A INTERNAL COMBUSTION ENGINE
30B TORQUE CONVERTER
30C TRANSMISSION
30D DRIVE SHAFT
31 FUEL CONSUMPTION SENSOR
32 DISPLAY DEVICE
33 INPUT DEVICE
34 TIMER
41 PROCESSING DEVICE
42 STORAGE DEVICE
43 INPUT/OUTPUT INTERFACE DEVICE
44 DISPLAY DEVICE
45 INPUT DEVICE
46 COMMUNICATION DEVICE
47 OUTPUT DEVICE
51 LOADING WEIGHT DATA ACQUISITION UNIT
52 VEHICLE SPEED DATA ACQUISITION UNIT
53 ROAD SURFACE DATA ACQUISITION UNIT
54 FUEL CONSUMPTION DATA ACQUISITION UNIT
55 TIME DATA ACQUISITION UNIT
56 TIRE DATA ACQUISITION UNIT
61 CURRENT DAMAGE AMOUNT CALCULATION UNIT
62 TARGET AMOUNT CALCULATION UNIT
63 PRODUCTION COST CALCULATION UNIT
71 STORAGE UNIT
81 INPUT UNIT
82 OUTPUT UNIT
DPA SOIL DISCHARGING SITE
HL CARRYING PATH
LPA LOADING SITE

The invention claimed is:

1. A transporter vehicle management system comprising:
a transporter vehicle;
a loading weight data acquisition unit that acquires loading weight data indicating a loading weight of a load on the transporter vehicle;
a vehicle speed data acquisition unit that acquires vehicle speed data indicating a traveling speed of the transporter vehicle;
a road surface data acquisition unit that acquires road surface data indicating a condition of a road surface on which the transporter vehicle travels;
an inertial measurement unit that calculates transporter vehicle acceleration in a rotation direction around each of three axes which are perpendicular to each other;
a current damage amount calculation unit that estimates a current damage amount of a body frame of the transporter vehicle on the basis of: a result of measurement by the inertial measurement unit which is disposed on the body frame of the transporter vehicle;
a target amount calculation unit that calculates a target loading weight or a target traveling speed in which the current damage amount is set to a predetermined value;
an output unit that outputs the target loading weight or the target traveling speed;
a fuel consumption data acquisition unit that acquires fuel consumption data indicating a fuel consumption of the transporter vehicle when the transporter vehicle travels with the target loading weight and at the target traveling speed;
a time data acquisition unit that acquires time data indicating time required for the transporter vehicle to travel through a predetermined course in a mine with the target loading weight and at the target traveling speed, with one trip through the predetermined course being a cycle and the time for the one trip being a cycle time;
a tire data acquisition unit that indicates a life of a tire of the transporter vehicle; and
a production cost calculation unit that calculates a production cost of the mine on the basis of the target loading weight, the target traveling speed, the fuel consumption, and the time according to formula (1):

[production cost ($/ton)]=[fuel consumption+tire life]/[loading weight/cycle time]　　(1), wherein the output unit outputs the production cost.

2. The transporter vehicle management system according to claim 1, wherein the target amount calculation unit calculates the target loading weight or the target traveling speed in which the current damage amount is set to be equal to or less than a threshold as the predetermined value.

3. The transporter vehicle management system according to claim 1, wherein the target amount calculation unit calculates a target road surface condition.

4. The transporter vehicle management system according to claim 1, comprising a storage unit that stores correlation data indicating a relationship between the loading weight, the traveling speed, the condition of the road surface, and the damage amount of the body frame of the transporter vehicle, wherein
the target amount calculation unit calculates the target loading weight or the target traveling speed on the basis of the correlation data.

5. The transporter vehicle management system according to claim 4, wherein correlation data is generated on a basis of a detection value of a stress gauge when the dump truck travels on road surfaces having various road surface conditions at various traveling speeds with the stress gauge attached to the body frame of the dump truck.

6. The transporter vehicle management system according to claim 1, wherein the target amount calculation unit calculates the target loading weight or the target traveling speed in which the production cost calculated by the production cost calculation unit is minimized.

7. The transporter vehicle management system according to claim 1, wherein the damage amount is an index indicating a fatigue cumulative frequency acting on the body frame and a function of a stress acting on the body frame per unit time.

8. The transporter vehicle management system according to claim 1, wherein the damage amount is a numerical value indicating how many times an equivalent stress acting on the body frame in any cycle is relative to a reference value 1.0 when an equivalent stress acting on the body frame in a reference cycle is defined as the reference value 1.0.

9. The transporter vehicle management system according to claim 8, wherein the reference cycle is determined by acquiring data of a distance, a gradient, the traveling speed, and a roughness of the road surface in a carrying path from a loading site to a soil discharging site for a plurality of mines; obtaining a mean of the acquired data; causing the dump truck to travel on a carrying path simulating the obtained mean, which is the reference cycle, and the equivalent stress acting on the body frame is obtained.

10. A transporter vehicle management method comprising:
providing a transporter vehicle;
acquiring loading weight data indicating a loading weight of a load on the transporter vehicle;
acquiring vehicle speed data indicating a traveling speed of the transporter vehicle;
acquiring road surface data indicating a condition of a road surface on which the transporter vehicle travels;
calculating transporter vehicle acceleration in a rotation direction around each of three axes which are perpendicular to each other;
estimating a current damage amount of a body frame of the transporter vehicle on the basis of a result of measurement by an inertial measurement unit which is disposed on the body frame of the transporter vehicle; and
calculating a target loading weight or a target traveling speed in which the current damage amount is set to a predetermined value;
acquiring fuel consumption data indicating a fuel consumption of the transporter vehicle when the transporter vehicle travels with the target loading weight and at the target traveling speed;
acquiring time data indicating time required for the transporter vehicle to travel through a predetermined course in a mine with the target loading weight and at the target traveling speed, with one trip through the predetermined course being a cycle and the time for the one trip being a cycle time;
acquiring tire life data on a life of a tire of the transporter vehicle;
calculating a production cost of the mine on the basis of the target loading weight, the target traveling speed, the fuel consumption, and the time according to formula (1):

[production cost ($/ton)]=[fuel consumption+tire life]/[loading weight/cycle time]   (1), and outputting the production cost.

11. The transporter vehicle management system according to claim 10, wherein the damage amount is an index indicating a fatigue cumulative frequency acting on the body frame and a function of a stress acting on the body frame per unit time.

12. The transporter vehicle management system according to claim 10, wherein the damage amount is a numerical value indicating how many times an equivalent stress acting on the body frame in any cycle is relative to a reference value 1.0 when an equivalent stress acting on the body frame in a reference cycle is defined as the reference value 1.0.

13. The transporter vehicle management system according to claim 12, wherein the reference cycle is determined by acquiring data of a distance, a gradient, the traveling speed, and a roughness of the road surface in a carrying path from a loading site to a soil discharging site for a plurality of mines; obtaining a mean of the acquired data; causing the dump truck to travel on a carrying path simulating the obtained mean, which is the reference cycle, and the equivalent stress acting on the body frame is obtained.

* * * * *